United States Patent
Kang et al.

(10) Patent No.: US 8,818,050 B2
(45) Date of Patent: Aug. 26, 2014

(54) METHOD AND SYSTEM FOR RECOGNIZING IMAGES

(75) Inventors: Chung-Chia Kang, Tainan (TW); Jian-Ren Chen, Hsinchu County (TW); Chih-Wei Chen, New Taipei (TW); Leii H. Chang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 37 days.

(21) Appl. No.: 13/431,993

(22) Filed: Mar. 28, 2012

(65) Prior Publication Data
US 2013/0156301 A1 Jun. 20, 2013

(30) Foreign Application Priority Data
Dec. 19, 2011 (TW) .............................. 100147200 A (51) Int. Cl.
*G06K 9/00* (2006.01)
(52) U.S. Cl.
USPC ........................................................... 382/116
(58) Field of Classification Search
None
See application file for complete search history.

(56) References Cited

U.S. PATENT DOCUMENTS

| | | | |
|---|---|---|---|
| 6,990,217 B1 | 1/2006 | Moghaddam et al. | |
| 7,362,886 B2* | 4/2008 | Rowe et al. | 382/118 |
| 7,551,755 B1* | 6/2009 | Steinberg et al. | 382/118 |
| 7,715,597 B2* | 5/2010 | Costache et al. | 382/118 |
| 7,773,811 B2* | 8/2010 | Podilchuk | 382/218 |
| 7,912,246 B1 | 3/2011 | Moon et al. | |
| 8,351,712 B2* | 1/2013 | Lee | 382/224 |
| 8,553,983 B2* | 10/2013 | Imaoka | 382/190 |
| 2002/0018596 A1* | 2/2002 | Nagao | 382/205 |
| 2003/0110038 A1 | 6/2003 | Sharma et al. | |
| 2006/0008150 A1* | 1/2006 | Zhao et al. | 382/190 |
| 2006/0198554 A1* | 9/2006 | Porter et al. | 382/159 |

(Continued)

FOREIGN PATENT DOCUMENTS

| | | |
|---|---|---|
| CN | 1870047 | 11/2006 |
| CN | 101142586 | 3/2008 |

(Continued)

OTHER PUBLICATIONS

Yuchun Fang et al., "Improving LBP Features for Gender Classification", Proceedings of the 2008 International Conference on Wavelet Analysis and Pattern Recognition, Aug. 30-31, 2008, pp. 373-377.

(Continued)

*Primary Examiner* — Nirav G Patel
*Assistant Examiner* — Oneal R Mistry
(74) *Attorney, Agent, or Firm* — Jianq Chyun IP Office (57) ABSTRACT

A method and a system for recognizing at least one testing image according to classes are provided, wherein each of the classes includes sample images. The method includes generating an average image of each class according to the sample images, generating a feature enhancement mask according to differences between the average images of the classes, enhancing the sample images of each class by using the feature enhancement mask to generate a plurality of enhanced sample images corresponding to each class, and training a classifier according to the enhanced sample images of each class. The method also includes enhancing the at least one testing image by using the feature enhancement mask to generate an enhanced testing image, classifying the enhanced testing image into one of the classes by using the classifier, and recognizing that the testing image belongs to the classified class. Thereby, this method can effectively recognize the testing image.

21 Claims, 8 Drawing Sheets

(56) References Cited

U.S. PATENT DOCUMENTS

| | | | |
|---|---|---|---|
| 2008/0130962 A1* | 6/2008 | Lee et al. | 382/118 |
| 2009/0180671 A1* | 7/2009 | Lee et al. | 382/118 |
| 2011/0091071 A1* | 4/2011 | Sabe et al. | 382/103 |
| 2012/0264095 A1* | 10/2012 | Yu et al. | 434/236 |

FOREIGN PATENT DOCUMENTS

| | | |
|---|---|---|
| CN | 101419671 | 4/2009 |
| CN | 101425138 | 5/2009 |
| CN | 101584575 | 11/2009 |
| TW | I268097 | 12/2006 |
| TW | I268453 | 12/2006 |
| TW | I281641 | 5/2007 |
| TW | I309947 | 5/2009 |
| TW | I330036 | 9/2010 |

OTHER PUBLICATIONS

Ozlem Ozbudak et al., "Effects of the Facial and Racial Features on Gender Classification", MELECON 2010-2010 15th IEEE Mediterranean Electrotechnical Conference, 2010, pp. 26-29.

Youngwoo Yoon et al., "An Experimental Comparison of Preprocessing Methods for Age Classification", The 18th IEEE international Symposium on Robot and Human Interactive Communication, Sep. 27-Oct. 2, 2009, pp. 951-954.

Asuman Gunay et al., "Automatic Age Classification with LBP", Computer and Information Sciences, 2008. ISCIS '08. 23rd International, 2008, pp. 1-4.

Feng Gao et al., "Face Age Classification on Consumer Images with Gabor Feature and Fuzzy LDA Method", Proceeding ICB '09 Proceedings of the Third International Conference on Advances in Biometrics, 2009, pp. 1-10.

* cited by examiner

METHOD AND SYSTEM FOR RECOGNIZING IMAGES

CROSS-REFERENCE TO RELATED APPLICATION

This application claims the priority benefit of Taiwan application serial no. 100147200, filed Dec. 19, 2011. The entirety of the above-mentioned patent application is hereby incorporated by reference herein and made a part of this specification.

BACKGROUND

1. Technical Field

The disclosure relates to an image recognizing method and an image recognizing system in which features of an image are enhanced by using a feature enhancement mask.

2. Related Art

Along with the advancement of digital image processing techniques, many image recognizing products have been developed, such as digital cameras with human face recognition functions, driving recorders with pedestrian recognition functions, and monitors with pedestrian traffic flow calculation functions. The goal of the image processing is to make the computers capable of recognizing digital images in the way that human beings do.

There are some techniques for identifying the gender or age of a person in the digital image processing field, in which one's gender or age is recognized according to digital images of the person. However, because the features used by human beings for identifying one's gender or age are very intuitive, it is very difficult for engineers or scientists to develop a set of recognition rules based on human intuitions. Another problem is that what human face features should be used for human face recognition. Generally, unprocessed pixel values in a human face image are input into a trainer as human face features. This technique is very simply but offers unsatisfactory result. Thereby, how to improve the accuracy of image recognition has become a major subject in the industry.

SUMMARY

An image recognizing method and an image recognizing system are introduced herein, in which features in a digital image are enhanced so that the accuracy of image recognition is improved.

The disclosure provides a method for recognizing at least one testing image according to a plurality of classes, in which each of the classes includes a plurality of sample images. The image recognizing method includes generating an average image of each of the classes according to the sample images, generating a feature enhancement mask according to differences between the average images of the classes, and enhancing the sample images of each of the classes by using the feature enhancement mask to generate a plurality of enhanced sample images corresponding to each of the classes. The image recognizing method also includes training a classifier according to the enhanced sample images of each of the classes, enhancing the at least one testing image by using the feature enhancement mask to generate an enhanced testing image, classifying the enhanced testing image into one of the classes by using the trained classifier, and recognizing that the testing image belongs to the class.

The disclosure provides an image recognizing system for recognizing at least one testing image according to a plurality of classes, in which each of the classes includes a plurality of sample images. The image recognizing system includes an image capturing unit, an image recognizing unit, and a classifier training unit. The image recognizing unit is coupled to the image capturing unit, and the classifier training unit is coupled to the image capturing unit and the image recognizing unit. The image capturing unit captures the at least one testing image. The classifier training unit generates an average image of each of the classes according to the sample images, generates a feature enhancement mask according to differences between the average images of the classes, and enhances the sample images of each of the classes by using the feature enhancement mask to generate a plurality of enhanced sample images corresponding to each of the classes. The classifier training unit also trains a classifier according to the enhanced sample images corresponding to each of the classes. The image recognizing unit enhances the at least one testing image by using the feature enhancement mask to generate an enhanced testing image, classifies the enhanced testing image into one of the classes by using the trained classifier, and recognizes that the testing image belongs to the class.

As described above, in the disclosure, a feature enhancement mask is generated according to the average image of each class, and features in an image are enhanced by using the feature enhancement mask. The enhanced features increase the discrimination between the classes when a classifier is trained, so that the accuracy of image recognition is improved.

These and other exemplary embodiments, features, aspects, and advantages of the disclosure will be described and become more apparent from the detailed description of exemplary embodiments when read in conjunction with accompanying drawings.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

First Exemplary Embodiment

Figure 1:
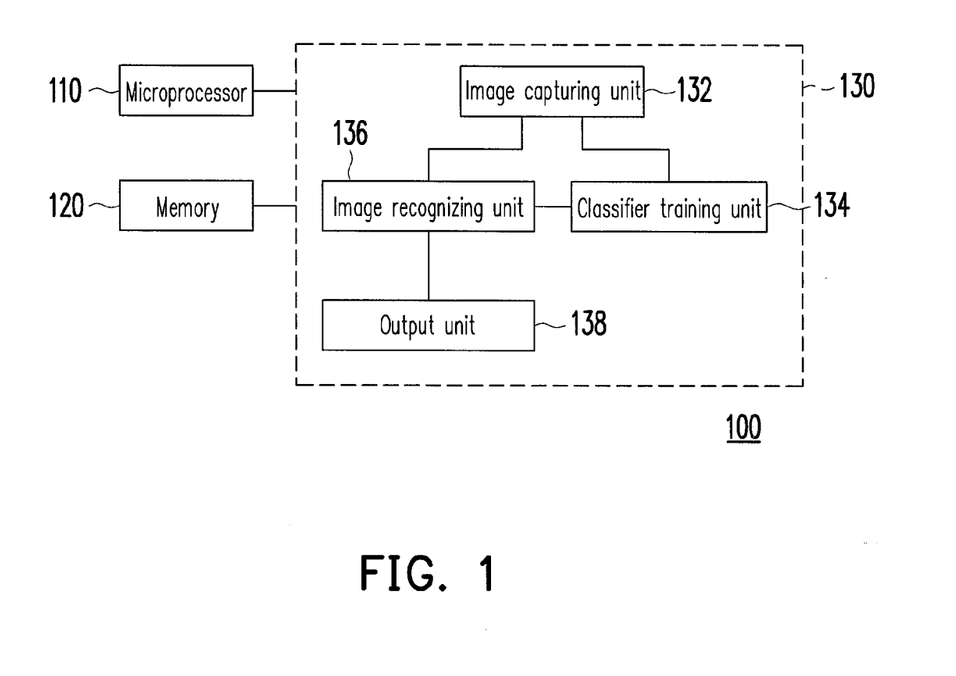
FIG. 1 is a block diagram of a computing device according to a first exemplary embodiment.

FIG. 1 is a block diagram of a computing device according to the first exemplary embodiment.

Referring to FIG. 1, the computing device 100 includes a microprocessor 110, a memory 120, and an image recognizing system 130 coupled to the microprocessor 110 and the memory 120.

The microprocessor 110 controls the overall operation of the computing device 100. The microprocessor 110 can be a central processing unit (CPU).

The memory 120 temporarily stores commands and related data executed by the microprocessor 110. In the present exemplary embodiment, the memory 120 is a dynamic random access memory (DRAM). However, the disclosure is not limited thereto, and in another exemplary embodiment, the memory 120 can be a static random access memory (SRAM) or any other suitable memory as well.

Figure 2:
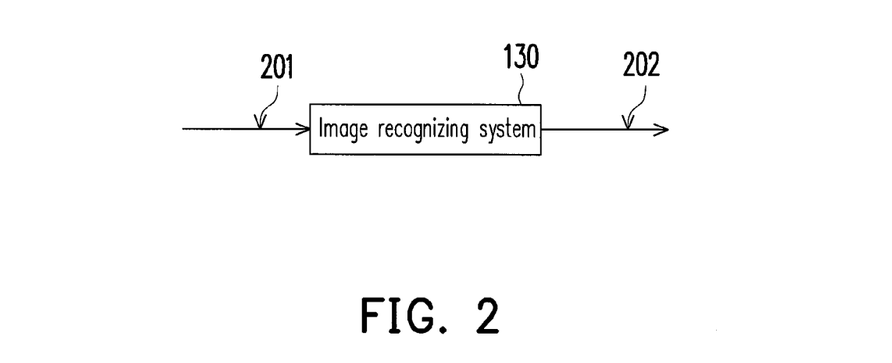
FIG. 2 is an operation diagram of an image recognizing system according to the first exemplary embodiment.

The image recognizing system 130 is configured for recognizing images. To be specific, the image recognizing system 130 recognizes a class of an image according to a plurality of predetermined classes. Namely, when an image 201 is input into the image recognizing system 130, the image recognizing system 130 outputs a class 202 corresponding to the image 201 (also referred to as the testing image), as shown in FIG. 2.

Figure 3A:
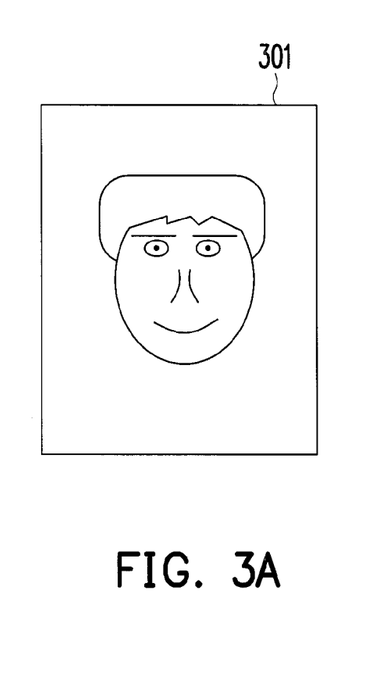
FIG. 3A and FIG. 3B are diagrams of human face images according to the first exemplary embodiment.
Figure 3B:
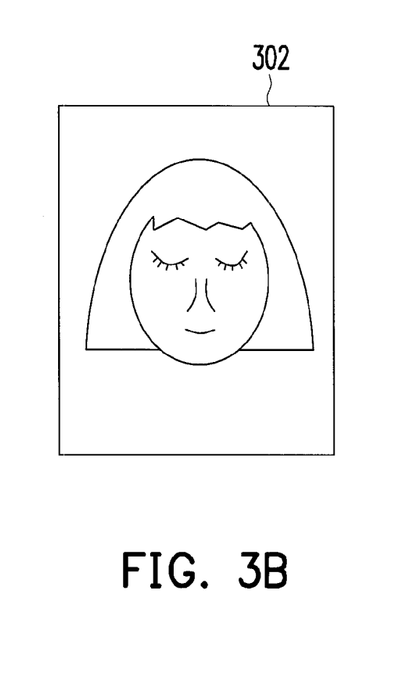

In the present exemplary embodiment, the image recognizing system 130 recognizes whether an image belongs to a class "male" or a class "female". Namely, when an input image is a male face image 301 (as shown in FIG. 3A), the image recognizing system 130 classifies the image into the class "male", and when the input image is a female face image 302 (as shown in FIG. 3B), the image recognizing system 130 classifies the image into the class "female".

It should be understood herein that recognizing whether an image belongs to the class "male" or the class "female" is only an example and the disclosure is not limited thereto. In another exemplary embodiment, the image recognizing system 130 can also be configured to recognize whether an image belongs to a class "young", a class "middle-aged", or a class "senior". Additionally, the disclosure is not limited to the recognition of human face images, and in another exemplary embodiment, the image recognizing system 130 can also be configured to enhance the differences between word templates and recognize words.

In the present exemplary embodiment, the image recognizing system 130 includes an image capturing unit 132, a classifier training unit 134, an image recognizing unit 136, and an output unit 138.

The image capturing unit 132 is configured for capturing an image. The image capturing unit 132 can be a video camera or a digital camera. Additionally, the image capturing unit 132 can also be an image detection device for detecting a specific object in an image. For example, the image capturing unit 132 is a video camera with a human face detection function, and after capturing an image, the image capturing unit 132 automatically detects the position of a human face in the image and captures a human face image.

The classifier training unit 134 is coupled to the image capturing unit 132 and configured for training a classifier according to sample images of each class. The image recognizing unit 136 is coupled to the classifier training unit 134 and the image capturing unit 132 and configured for recognizing the class of an image according to the trained classifier. The output unit 138 is coupled to the image recognizing unit 136 and configured for outputting the recognition result generated by the image recognizing unit 136.

Figure 4:
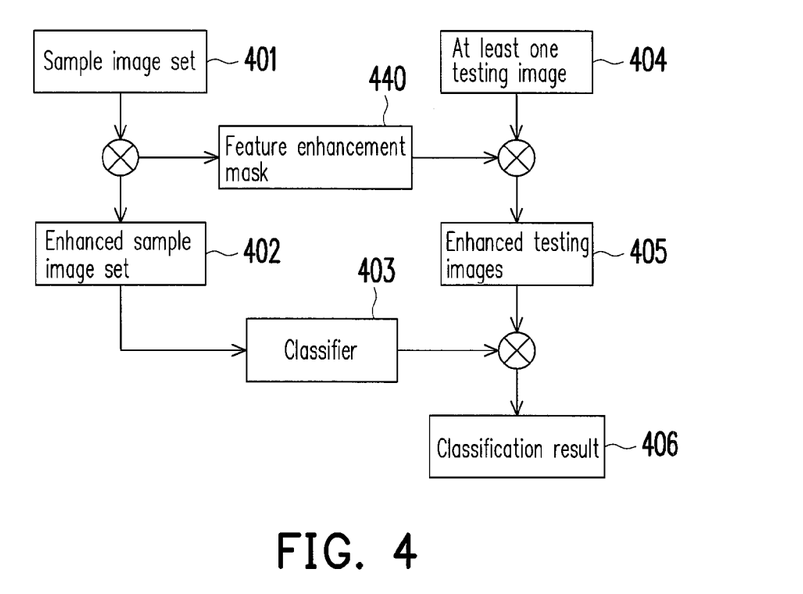
FIG. 4 is a schematic block diagram of an image recognition process according to the first exemplary embodiment.

FIG. 4 is a schematic block diagram of an image recognition process according to the first exemplary embodiment.

Referring to FIG. 4, first, the classifier training unit 134 generates a feature enhancement mask 440 according to a sample image set 401. To be specific, the classifier training unit 134 generates an average image of each class according to the sample images of the class and generates the feature enhancement mask 440 according to the differences between the average images of the classes.

Figure 5:
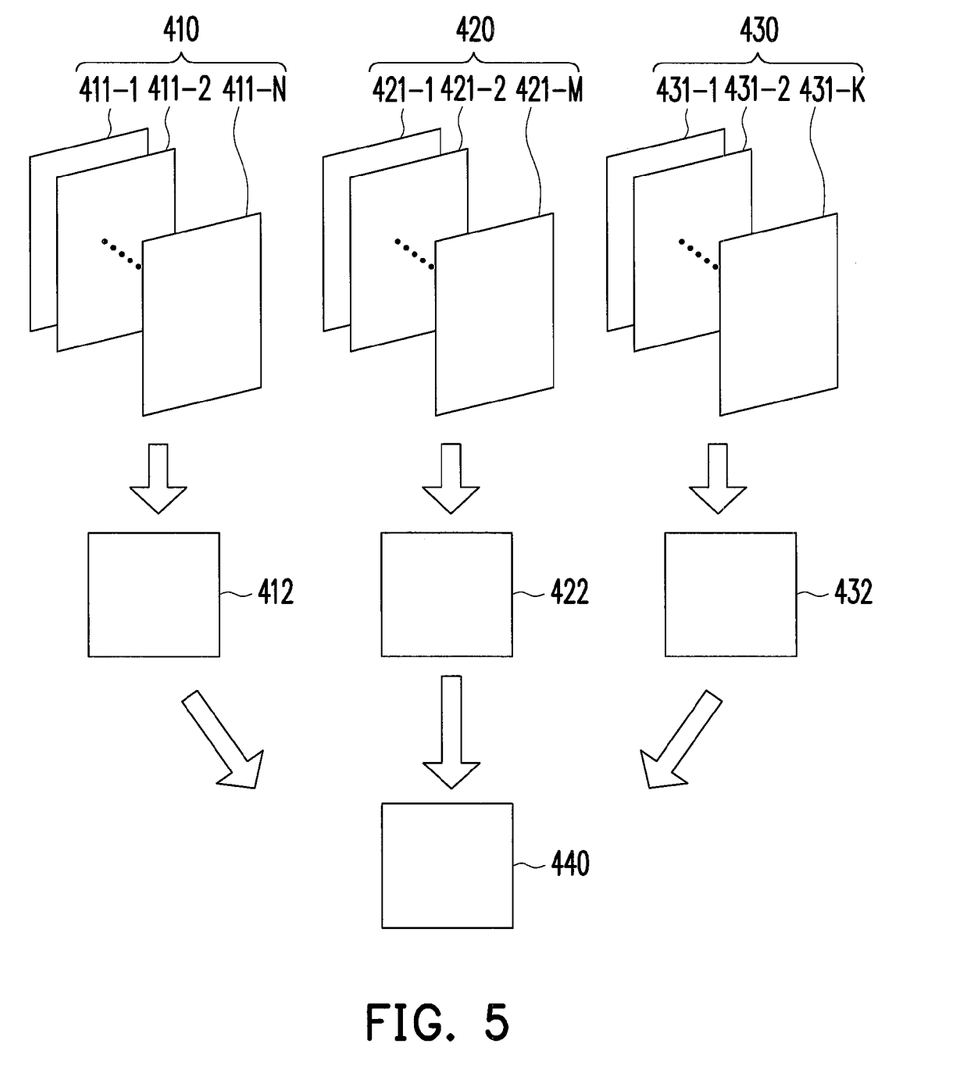
FIG. 5 is a diagram illustrating the generation of a feature enhancement mask according to the first exemplary embodiment.

FIG. 5 is a diagram illustrating the generation of a feature enhancement mask according to the first exemplary embodiment.

Referring to FIG. 5, in the present exemplary embodiment, the sample image set 401 contains a plurality of sample images collected according to each class. For example, the sample images 411-1~411-N belong to a first class 410, the sample images 421-1~421-M belong to a second class 420, and the sample images 431-1~431-K belong to a third class 430. Herein the first class 410 may be the class "young", and the sample images 411-1~411-N may be images of young faces.

The sample image 411-1 is the first sample image in the first class 410, the sample image 411-2 is the second sample image in the first class 410, and so on. There are N sample images in the first class 410, and N is a natural number. Similarly, the sample image 421-1 is the first sample image in the second class 420, the sample image 421-2 is the second sample image in the second class 420, and so on. There are M sample images in the second class 420, and M is a natural number. Similarly, the sample image 431-1 is the first sample image in the third class 430, the sample image 431-2 is the second sample image in the third class 430, and so on. There are K sample images in the third class 430, and K is a natural number. In the present exemplary embodiment, N, M, and K may be the same or different numbers.

Figure 6:
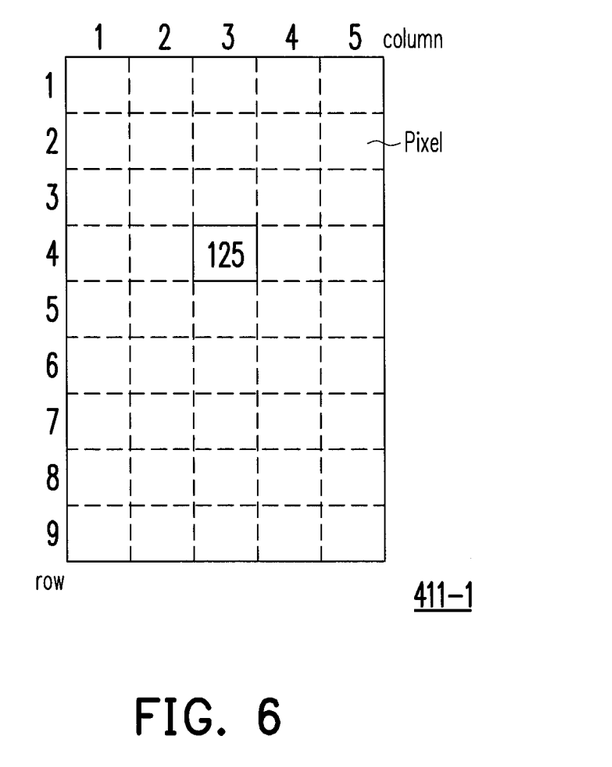
FIG. 6 is a diagram of a sample image example according to the first exemplary embodiment.

FIG. 6 is a diagram of a sample image example according to the first exemplary embodiment.

Referring to FIG. 6, in the present exemplary embodiment, the sample images 411-1~411-N, the sample images 421-1~421-M, and the sample images 431-1~431-K have the same structure. Below, the sample image 411-1 will be taken as an example.

The sample image 411-1 includes a plurality of pixels, and these pixels are arranged into an array. For example, the array of the sample image 411-1 has 5 columns and 9 rows, each position in the array is corresponding to a pixel, and each pixel has a pixel value. For example, the pixel value of the pixel in the $3^{rd}$ column and the $4^{th}$ row of the sample image 411-1 is 125. It should be understood that the sample image illustrated in FIG. 6 is only an example, and the disclosure is not limited thereto. In another exemplary embodiment, a sample image may be an array of any other size.

In the present exemplary embodiment, the sample images are stored in the memory 120 in advance. However, in another exemplary embodiment, these sample images can also be captured by the image capturing unit 132.

Referring to FIG. 5 again, the classifier training unit 134 generates an average image of each class according to the sample images of the class. To be specific, the classifier training unit 134 generates an average image 412 corresponding to the first class 410 according to the sample images 411-

1~411-N of the first class 410, generates an average image 422 corresponding to the second class 420 according to the sample images 421-1~421-M of the second class 420, and generates an average image 432 corresponding to the third class 430 according to the sample images 431-1~431-K of the third class 430. To be specific, the average image of each class has a plurality of average pixel values, and these average pixel values are corresponding to the pixels in the sample images, wherein the average pixel value in the $i^{th}$ column and the $j^{th}$ row of the average image of the $m^{th}$ class is obtained by dividing a sum of the pixel values of the pixels in the $i^{th}$ columns and the $i^{th}$ rows of the sample images of the $m^{th}$ class by the number of the sample images of the $m^{th}$ class. The classifier training unit 134 generates the average image of each class by using following equation (1):

$$A_{m,i,j} = \frac{1}{n_m} \sum_{k=1}^{n_m} I_{i,j}^{m,k} \qquad (1)$$

In foregoing equation (1), $A_{m,i,j}$ is the average pixel value in the $i^{th}$ column and the $j^{th}$ row of the average image of the $m^{th}$ class, $n_m$, is the number of the sample images in the $m^{th}$ class, $I_{i,j}^{m,k}$ and is the pixel value of the pixel in the $i^{th}$ column and the $j^{th}$ row of the $k^{th}$ sample image of the $m^{th}$ class.

It should be noted that in the present exemplary embodiment, the sample images are black and white images. Namely, each sample image has only a luminance channel, and an average image is calculated according to the luminance channels in the sample images (i.e., $I_{i,j}^{m,k}$ in foregoing equation (1) represents a luminance value).

However, in another exemplary embodiment of the disclosure, each sample image can be a color image and has R, G, and B channels or Y, Cr, and Cb channels. In this case, $I_{i,j}^{m,k}$ in foregoing equation (1) can be any one of aforementioned color channels and an average image is calculated according to these color channels.

In the present exemplary embodiment, the classifier training unit 134 further generates the feature enhancement mask 440 according to the differences between the average images of the classes. The feature enhancement mask 440 has a plurality of feature enhancement values arranged into an array, and these feature enhancement values are obtained according to a plurality of absolute differences between the average pixel values of the average images of the classes.

In the present exemplary embodiment, the classifier training unit 134 may generate the feature enhancement mask 440 through different technique according to the number of the classes. When there are two classes, the absolute difference in the $i^{th}$ column and the $j^{th}$ row among aforementioned absolute differences is equal to an absolute value of a difference between the average pixel value in the $i^{th}$ column and the $j^{th}$ row of the average image of the $1^{st}$ class and the average pixel value in the $i^{th}$ column and the $j^{th}$ row of the average image of the $2^{nd}$ class. The feature enhancement value in the $i^{th}$ column and the $j^{th}$ row of the feature enhancement mask 440 is obtained by dividing the absolute difference in the $i^{th}$ column and the $j^{th}$ row among the absolute differences by the maximum absolute difference among the absolute differences.

The classifier training unit 134 may generate the feature enhancement mask 440 by using following equation (2):

$$M_{i,j} = |A_{1,i,j} - A_{2,i,j}| \Big/ \max_{x,y}(|A_{1,x,y} - A_{2,x,y}|) \qquad (2)$$

In foregoing equation (2), $M_{i,j}$ is the feature enhancement value in the $i^{th}$ column and the $j^{th}$ row of the feature enhancement mask 440, $A_{1,i,j}$ is the pixel value corresponding to the pixel in the $i^{th}$ column and the $j^{th}$ row of the average image of one of the classes, $A_{2,i,j}$ is the pixel value corresponding to the pixel in the $i^{th}$ column and the $j^{th}$ row of the average image of another class, and $$\max_{x,y}(|A_{1,x,y} - A_{2,x,y}|)$$

represents the maximum difference between the average images of two classes.

On the other hand, when there are more than two classes, the absolute difference in the $i^{th}$ column and the $j^{th}$ row among aforementioned absolute differences is equal to an absolute value of the difference between the maximum average pixel value among the average pixel values in the $i^{th}$ column and the $j^{th}$ row of the average images of the classes and the minimum average pixel value among the average pixel values in the $i^{th}$ column and the $j^{th}$ row of the average images of the classes. The feature enhancement value in the $i^{th}$ column and the $j^{th}$ row of the feature enhancement mask 440 is obtained by dividing the absolute difference in the $i^{th}$ column and the $j^{th}$ row among the absolute differences by the maximum absolute difference among the absolute differences. The classifier training unit 134 may generate the feature enhancement mask 440 by using following equation (3):

$$M_{i,j} = \frac{\left|\max_c A_{c,i,j} - \min_c A_{c,i,j}\right|}{\max_{x,y}\left(\left|\max_c A_{c,x,y} - \min_c A_{c,x,y}\right|\right)} \qquad (3)$$

In foregoing equation (3), $M_{i,j}$ is the feature enhancement value in the it column and the $j^{th}$ row of the feature enhancement mask 440, $A_{c,i,j}$ is the pixel value corresponding to the pixel in the $i^{th}$ column and the $j^{th}$ row of the average image of the $c^{th}$ class, and $$\max_{x,y}\left(\left|\max_c A_{c,x,y} - \min_c A_{c,x,y}\right|\right)$$

represents the maximum difference between the average images of c classes.

In the present exemplary embodiment, the feature enhancement mask 440 shows the discrimination of each pixel in an image with respect to the classes (for example, the first class 410, the second class 420, and the third class 430), in which a greater feature enhancement value indicates a higher discrimination of the corresponding pixel.

Figure 7:
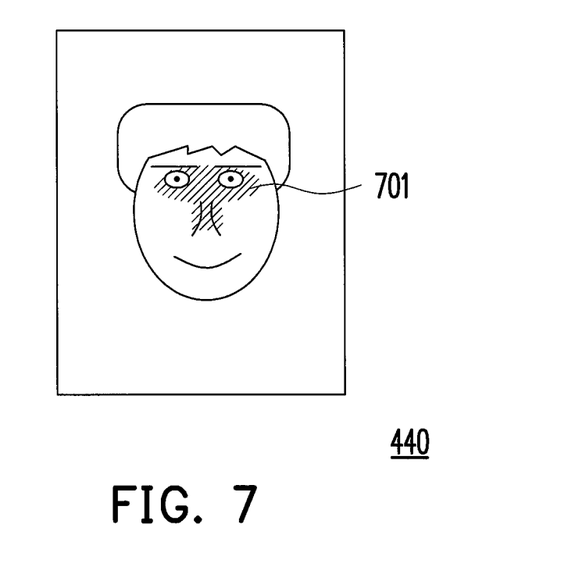
FIG. 7 is a diagram illustrating the relationship between a human face image and a feature enhancement mask thereof.

FIG. 7 is a diagram illustrating the relationship between a human face image and a feature enhancement mask thereof.

Referring to FIG. 7, the feature enhancement mask 440 is generated according to the sample images 411-1~411-N, the sample images 421-1~421-M, and the sample images 431-1~431-K, in which the sample images 411-1~411-N of the first class 410, the sample images 421-1~421-M of the second class 420, and the sample images 431-1~431-K of the third class 430 are all human face images, and the first class 410, the second class 420, and the third class 430 are respectively a class "young", a class "middle aged", and a class "senior". If the pixels within a discrimination area 701 in the feature enhancement mask 440 have greater pixel values than other pixels, the pixel values of the pixels around the eyes and nose of a human face can reflect the age of the person more effectively. However, the disclosure is not limited thereto, and in another exemplary embodiment with different classes or different sample images, the feature enhancement mask 440 can have a different discrimination area 701. It should be noted that the discrimination area 701 is only used for explaining the meaning of the feature enhancement mask 440 but not for differentiating the feature enhancement values in the feature enhancement mask 440. The values in the feature enhancement mask 440 are feature enhancement values arranged into an array, and these feature enhancement values are not grouped into different areas.

Referring to FIG. 4 again, the classifier training unit 134 enhances the sample image set 401 by using the feature enhancement mask 440, so as to generate a corresponding enhanced sample image set 402. To be specific, the classifier training unit 134 enhances each sample image of each class by using the feature enhancement mask 440, so as to generate a plurality of enhanced sample images corresponding to the class. Each enhanced sample image has a plurality of pixels arranged into an array, and each of the pixels is corresponding to a pixel value. Herein the pixel value corresponding to the pixel in the $i^{th}$ column and the $j^{th}$ row of the $k^{th}$ enhanced sample image of the $m^{th}$ class is obtained by multiplying the feature enhancement value in the $i^{th}$ column and the $j^{th}$ row of the feature enhancement mask 440 by the pixel value corresponding to the pixel in the $i^{th}$ column and the $j^{th}$ row of the $k^{th}$ sample image of the $m^{th}$ class.

The classifier training unit 134 may generate the enhanced sample images by using following equation (4):

$$E_{i,j}^{m,k} = M_{i,j} \times I_{i,j}^{m,k} \qquad (4)$$

In foregoing equation (4), $E_{i,j}^{m,k}$ is the pixel value corresponding to the pixel in the $i^{th}$ column and the $i^{th}$ row of the $k^{th}$ enhanced sample image of the $m^{th}$ class.

Figure 8:
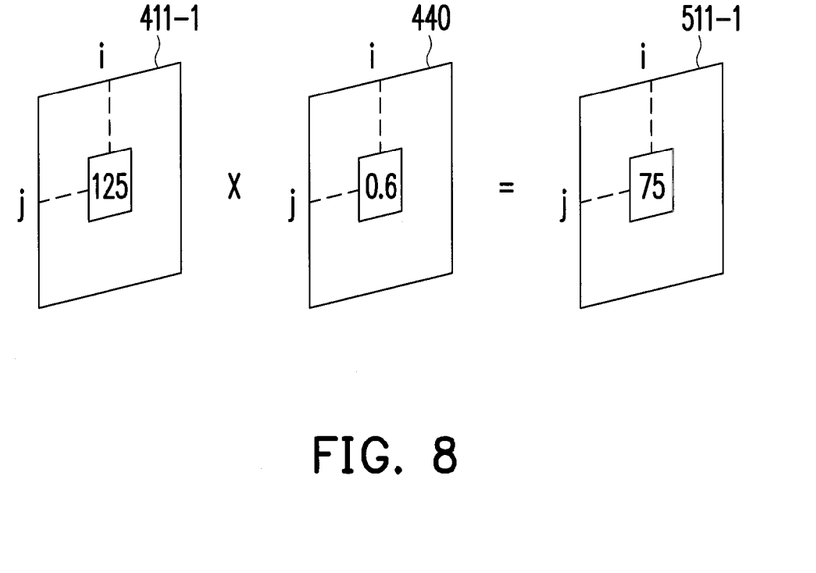
FIG. 8 is a diagram illustrating the generation of an enhanced sample image according to an exemplary embodiment of the disclosure.

FIG. 8 is a diagram illustrating the generation of an enhanced sample image according to an exemplary embodiment of the disclosure. The enhanced sample image corresponding to each sample image is generated through the same technique, and only the sample image 411-1 will be taken as an example for detailed description.

Referring to FIG. 8, pixel values corresponding to all the pixels of an enhanced sample image 511-1 corresponding to the sample image 411-1 are generated according to the pixel values corresponding to the pixels of the sample image 411-1 and the corresponding feature enhancement values in the feature enhancement mask 440. Assuming that the pixel value corresponding to the pixel in the $i^{th}$ column and the $j^{th}$ row of the sample image 411-1 is 125 (i.e., $I_{i,j}^{1,1}=125$) and the feature enhancement value in the $i^{th}$ column and the $j^{th}$ row of the feature enhancement mask 440 is 0.6 (i.e., $M_{i,j}=0.6$), the pixel value corresponding to the pixel in the $i^{th}$ column and the $j^{th}$ row of the enhanced sample image 511-1 can be calculated by using foregoing equation (4) (i.e., $E_{i,j}^{1,1}=75$).

Referring to FIG. 4 again, thereafter, the classifier training unit 134 trains a classifier 403 by using the enhanced sample image set 402. To be specific, the classifier training unit 134 trains the classifier 403 according to the enhanced sample images of each class. For example, the classifier training unit 134 trains the classifier 403 according to a K-means-clustering algorithm, a linear discriminant analysis (LDA), an adaptive boosting (AdaBoost) algorithm, a neural network, or a support vector machine (SVM).

As described above, the classifier training unit 134 generates the feature enhancement mask 440 and the classifier 403. In the present exemplary embodiment, the image recognizing system 130 stores the feature enhancement mask 440 and the classifier 403 into the memory 120. When the image capturing unit 132 captures images 404 subsequently, the image recognizing unit 136 reads the feature enhancement mask 440 and the classifier 403 from the memory 120 to recognize the images 404. The images 404 are the images to be recognized, or referred to as "testing images".

To be specific, the image recognizing unit 136 enhances the testing images 404 by using the feature enhancement mask 440 generated by the classifier training unit 134 to generate enhanced testing images 405, and the image recognizing unit 136 classifies the enhanced testing images 405 according to the classifier 403 trained by the classifier training unit 134, so as to recognize the class of each testing image 404 according to a classification result 406.

Each enhanced testing image 405 has a plurality of pixels arranged into an array (as shown in FIG. 6), and each of the pixels is corresponding to a pixel value. The pixel value corresponding to the pixel in the $i^{th}$ column and the $j^{th}$ row of the enhanced testing image 405 is obtained by multiplying the feature enhancement value in the $i^{th}$ column and the $j^{th}$ row of the feature enhancement mask 440 by the pixel value corresponding to the pixel in the $i^{th}$ column and the $j^{th}$ row of the corresponding testing image 404. The image recognizing unit 136 may generate the enhanced testing image 405 by using following equation (5):

$$U_{i,j} = M_{i,j} \times B_{i,j} \qquad (5)$$

In foregoing equation (5), $B_{i,j}$ is the pixel value corresponding to the pixel in the $i^{th}$ column and the $j^{th}$ row of the testing image 404, and $U_{i,j}$ is the pixel value corresponding to the pixel in the $i^{th}$ column and the $j^{th}$ row of the enhanced testing image 405.

Thereafter, the image recognizing unit 136 classifies the enhanced testing image 405 into one of the first class 410, the second class 420, and the third class 430 by using the classifier 403 and generates a classification result 406. In particular, the image recognizing unit 136 recognizes that the testing image 404 belongs to one of the first class 410, the second class 420, and the third class 430 according to the classification result 406. For example, if the classification result 406 corresponding to the enhanced testing image 405 is the class "young", the image recognizing unit 136 recognizes that the testing image 404 belongs to the class "young".

As described above, because the image recognizing system 130 in the disclosure generates the feature enhancement mask 440 according to the average image of each class, the feature enhancement mask 440 carries information of discrimination between different classes. Namely, the feature enhancement mask 440 carries information indicating the part of an image most likely has discrimination, and the part (i.e., pixels) most likely having discrimination is corresponding to greater feature enhancement values than the other part of the image. Thereby, by enhancing the sample image set 401 and the testing images 404 by using the feature enhancement mask 440, pixel values with discrimination in the images are enhanced (i.e., increased), so that the accuracy in image recognition is improved.

Figure 9:
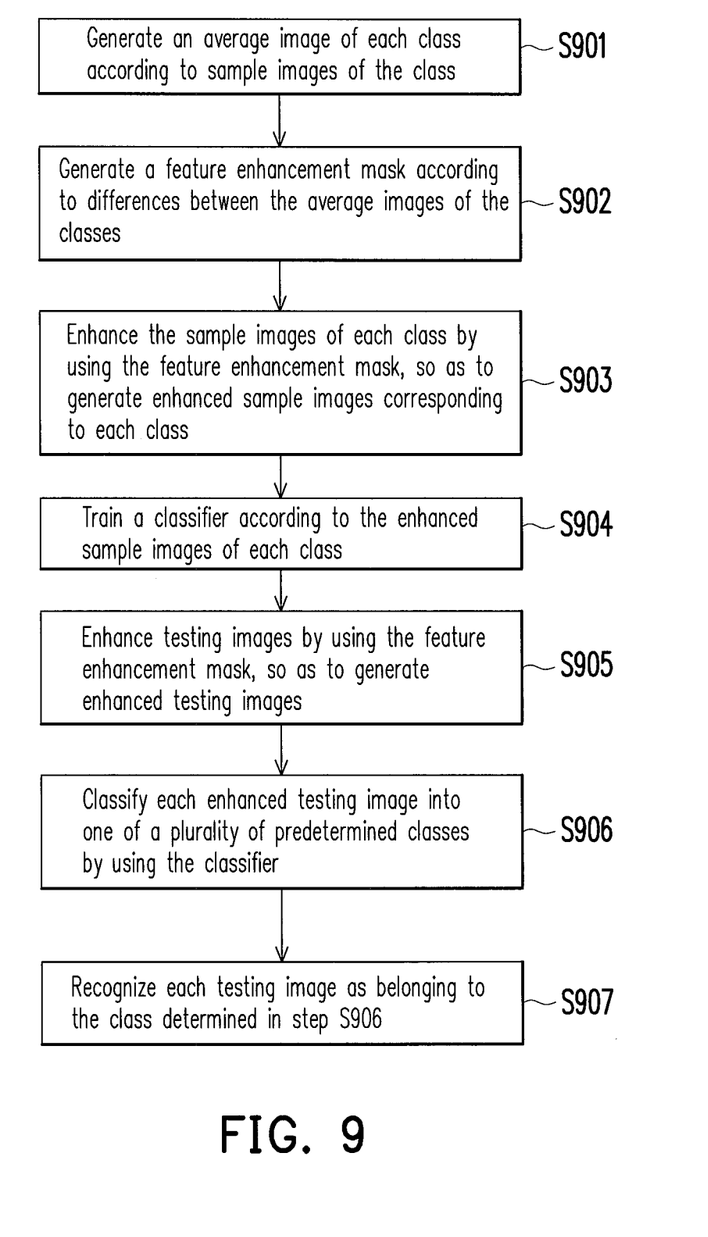
FIG. 9 is a flowchart of an image recognizing method according to the first exemplary embodiment.

FIG. 9 is a flowchart of an image recognizing method according to the first exemplary embodiment.

Referring to FIG. 9, in step S901, an average image of each class is generated according to the sample images of the class, and in step S902, a feature enhancement mask is generated according to differences between the average images of the classes. The techniques of generating the average image of each class and generating the feature enhancement mask have been described above with reference to accompanying drawings therefore will not be described herein.

Then, in step S903, the sample images of each class are enhanced by using the feature enhancement mask, so as to generate enhanced sample images corresponding to each class, and in step S904, a classifier is trained according to the enhanced sample images of each class. Next, in step S905, testing images are enhanced by using the feature enhancement mask to generate enhanced testing images. The techniques of generating the enhanced sample images and enhancing the testing images have been described above with reference to accompanying drawings therefore will not be described herein.

Thereafter, in step S906, each of the enhanced testing images is classified into one of a plurality of predetermined classes (for example, the first class 410, the second class 420, and the third class 430) by using the classifier. In the last step S907, each of the testing images is recognized as belonging to the class determined in step S906.

Second Exemplary Embodiment

Figure 10:
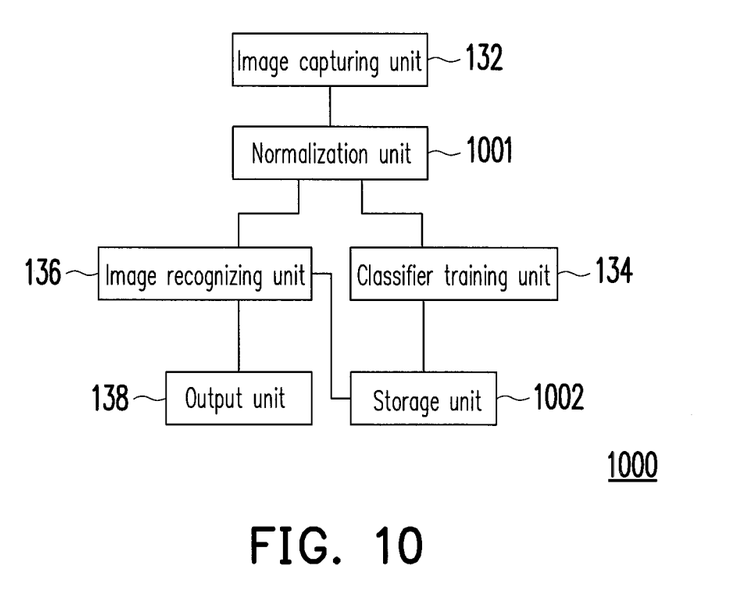
FIG. 10 is a block diagram of an image recognizing system according to a second exemplary embodiment.

FIG. 10 is a block diagram of an image recognizing system according to the second exemplary embodiment.

Referring to FIG. 10, the image recognizing system 1000 includes an image capturing unit 132, a normalization unit 1001, a classifier training unit 134, an image recognizing unit 136, and a storage unit 1002. The structures and functions of the image capturing unit 132, the classifier training unit 134, and the image recognizing unit 136 have been described above therefore will not be described herein.

The normalization unit 1001 is coupled to the image capturing unit 132 and configured to perform a histogram equalization operation on the sample image set 401 and the testing images 404.

To be specific, the histogram equalization is performed to adjust the contrast of an image. For example, if there is a very bright area (for example, under intense light) in an image, the luminance of this area can be reduced through histogram equalization. On the other hand, if there is a very dark area (for example, under insufficient light) in an image, the luminance of this area can be increased through histogram equalization. A histogram equalization process can be easily implemented by those having ordinary knowledge in the art therefore will not be described herein.

Figure 11:
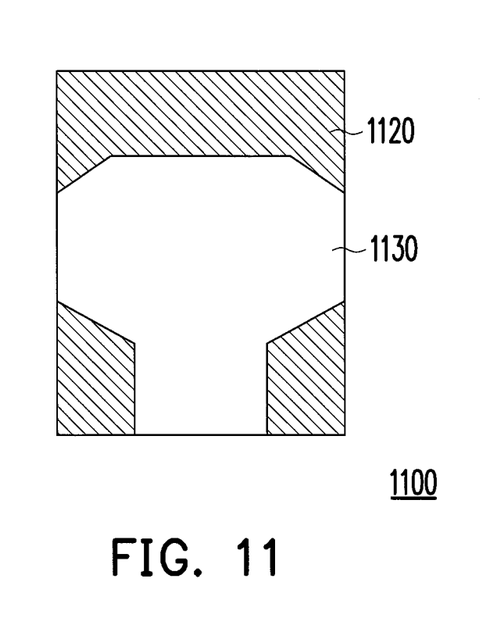
FIG. 11 is a diagram of a removal mask according to the second exemplary embodiment.

FIG. 11 is a diagram of a removal mask according to the second exemplary embodiment.

Referring to FIG. 11, in the present exemplary embodiment, the normalization unit 1001 further removes irrelevant pixels in the sample image set 401 and the testing images 404 by using a removal mask 1100. For example, the sample images in the sample image set 401 are human face images (as shown in FIG. 3A or FIG. 3B), and since non-face portions and hair portions in these sample images are not related to gender recognition, the irrelevant pixels can be removed by using a removal mask.

The removal mask 1100 has a plurality of bits arranged into an array (as shown in FIG. 6), and each of the bits has a value 1 or 0. The removal area 1120 contains the bits having the value 0, and the non-removal area 1130 contains the bits having the value 1. The normalization unit 1001 sets the pixel values corresponding to irrelevant pixels in each sample image to 0 according to the removal area 1120 in the removal mask 1100. For example, referring to FIG. 11 and FIG. 3A, the normalization unit 1001 sets the pixel values corresponding to the pixels (i.e., the hair portion and the non-face portion) in a male face image 301 to 0 according to the removal area 1120. Besides, the normalization unit 1001 keeps the pixel values corresponding to the pixels in the non-removal area 1130 (i.e., the face portion) of the male face image 301 according to the non-removal area 1130. Accordingly, the normalization unit 1001 can remove irrelevant pixels in each sample image so as to improve the accuracy in image recognition. However, the disclosure is not limited thereto, and in other exemplary embodiments, the removal mask 1100 can have different removal area 1120 and non-removal area 1130.

In the present exemplary embodiment, the normalization unit 1001 further reduces the dimension of the enhanced sample images through principal components analysis (PCA) and linear discriminant analysis (LDA). To be specific, a small number of significant bases are computed according to a plurality of signals through PCA, and signals are represented by these bases, so as to reduce the dimension of the signals. Generally, PCA transformation can be expressed in following equation (6):

$$g = M_{PCA} \times f \quad (6)$$

In foregoing equation (6), f is a vector which has a dimension of N×1 and represents a signal, $M_{PCA}$ is a matrix which has a dimension of M×N and represents the PCA transformation, and g is a vector which has a dimension of M×1 and represents a signal with reduced dimension, wherein M<N. In the present exemplary embodiment, f represents a signal of the enhanced sample image set 402.

To be specific, if the dimension of the pixels of the enhanced sample image set 402 is A×B (i.e., the enhanced sample image set 402 is a matrix having B columns and A rows), each column of the enhanced sample image set 402 is taken out and connected with each other to form a vector, wherein the length of the vector is A×B. The vector is actually a signal f. Namely, the enhanced sample image set 402 is expressed as a vector having a length A×B, wherein A×B=N. The dimension of the enhanced sample image set 402 can be reduced from N to M through the PCA transformation.

On the other hand, the LDA can reduce the dimension and keep the discrimination between the bases. Generally, the LDA transformation can be expressed in following equation (7):

$$h = M_{LDA} \times g \quad (7)$$

In foregoing equation (7), g is a vector which has a dimension of M×1 and represents a signal, $M_{LDA}$ is a matrix which has a dimension of p×m and represents the LDA transformation, and h is a vector which has a dimension of p×1 and represents the signal with reduced dimension, wherein P<M. Namely, the dimension of the signal g can be reduced from M to P through LDA.

Those having ordinary knowledge in the art should be able to implement the PCA and LDA algorithms and generate $M_{PCA}$ and $M_{LDA}$ easily. Thereby, the implementation of PCA and LDA and the generation of $M_{PCA}$ and $M_{LDA}$ will not be described herein.

In the present exemplary embodiment, the normalization unit 1001 reduces the dimension (i.e., from the dimension N to the dimension P) of the enhanced sample image set 402 according to foregoing equation (6) and equation (7). To be specific, the normalization unit 1001 expresses the enhanced sample image set 402 as a signal f in a dimension N, generates a signal g in a dimension M according to the signal f by using foregoing equation (6), generates a signal h in a dimension P according to the signal g by using foregoing equation (7), and expresses the enhanced sample image set 402 as the signal h.

In the present exemplary embodiment, the normalization unit 1001 also reduces the dimension of each enhanced testing image 405 through PCA and LDA according to foregoing equations (6) and (7). To be specific, the normalization unit 1001 expresses the enhanced testing image 405 as a signal f in a dimension N, generates a signal g in a dimension M according to the signal f by using foregoing equation (6), generates a signal h in a dimension P according to the signal g by using foregoing equation (7), and expresses the enhanced testing image 405 as the signal h.

Aforementioned PCA and LDA operations can reduce the dimension of an image. Thus, the curse of dimensionality can be avoided and the operation of the classifier 403 can be simplified, or less storage space is required for storing the enhanced sample image set 402.

The storage unit 1002 is coupled to the classifier training unit 134 and the image recognizing unit 136 and configured to store the feature enhancement mask 440 and the classifier 403 generated by the classifier training unit 134. When the image recognizing unit 136 is about to recognize the testing image 404, the image recognizing unit 136 reads the feature enhancement mask 440 and the classifier 403 from the storage unit 1002 to carry out image recognition. The storage unit 1002 can be a hard disk, a flash memory, or any other non-volatile storage medium.

Figure 12:
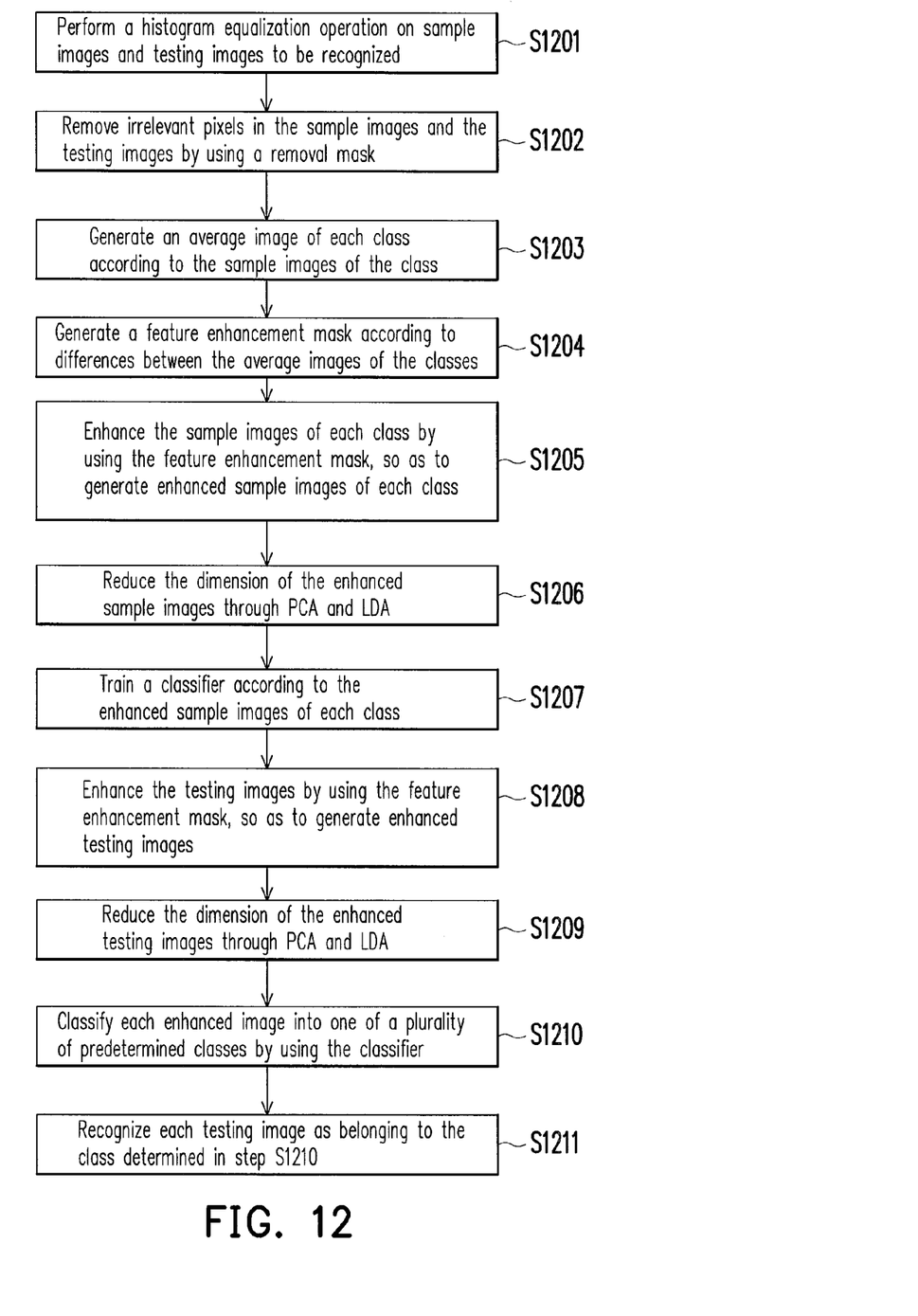
FIG. 12 is a flowchart of an image recognizing method according to the second exemplary embodiment.

FIG. 12 is a flowchart of an image recognizing method according to the second exemplary embodiment.

Referring to FIG. 12, in step S1201, a histogram equalization operation is performed on the sample images and the testing images, and in step S1202, irrelevant pixels in the sample images and the testing images are removed by using a removal mask.

Then, in step S1203, an average image of each class is generated according to the sample images of the class, and in step S1204, a feature enhancement mask is generated according to a difference between the average images of the classes.

Next, in step S1205, the sample images of each class are enhanced by using the feature enhancement mask, so as to generate enhanced sample images of each class, and in step S1206, the dimension of the enhanced sample images is reduced through PCA and LDA.

Thereafter, in step S1207, a classifier is trained according to the enhanced sample images of each class, and in step S1208, the testing images are enhanced by using the feature enhancement mask, so as to generate enhanced testing images.

Next, in step S1209, the dimension of each of the enhanced testing images is reduced through PCA and LDA.

In the last step S1210, each enhanced testing image is classified into one of a plurality of predetermined classes (for example, the first class 410, the second class 420, and the third class 430) by using the classifier, and in step S1211, each of the testing images is recognized as belonging to the class determined in step S1210.

As described above, the disclosure provides an image recognizing method and an image recognizing system, in which a feature enhancement mask is generated according to an average image of each class, and features in sample images and testing images are enhanced by using the feature enhancement mask, so that the accuracy in image recognition is improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image recognizing method, recognizing at least one testing image according to a plurality of classes, wherein each of the classes comprises a plurality of sample images, the image recognizing method comprising:

generating an average image of each of the classes according to the sample images;

generating a feature enhancement mask according to differences between the average images of the classes;

enhancing the sample images of each of the classes by using the feature enhancement mask to generate a plurality of enhanced sample images corresponding to the class;

training a classifier according to the enhanced sample images corresponding to each of the classes;

enhancing the at least one testing image by using the feature enhancement mask to generate at least one enhanced testing image;

classifying the at least one enhanced testing image into one of the classes by using the classifier; and recognizing that the at least one testing image belongs to the one of the classes, wherein each of the sample images has a plurality of pixels arranged into an array, each of the pixels is corresponding to a pixel value, and the average image of each of the classes has a plurality of average pixel values corresponding to the pixels of the sample images, wherein the average pixel value in an $i^{th}$ column and a $j^{th}$ row of the average image of an $m^{th}$ class is obtained by dividing a sum of the pixel values corresponding to the pixels in the $i^{th}$ columns and the $j^{th}$ rows of the sample images of the $m^{th}$ class by the number of the sample images of the $m^{th}$ class, wherein the feature enhancement mask has a plurality of feature enhancement values arranged into the array, and the feature enhancement values are obtained according to a plurality of absolute differences between the average pixel values of the average images of the classes, wherein a number of the classes is 2, wherein the absolute differences are arranged into the array, and a value in an $i^{th}$ column and a $j^{th}$ row of the absolute difference among the absolute differences is equal to an absolute value of a difference between the average pixel value in the $i^{th}$ column and the $j^{th}$ row of the average image of a $1^{st}$ class among classes and the average pixel value in the $i^{th}$ column and the $j^{th}$ row of the average image of a $2^{nd}$ class among classes, wherein the feature enhancement value in an $i^{th}$ column and a $j^{th}$ row of the feature enhancement mask is obtained by dividing the value in the $i^{th}$ column and the $j^{th}$ row of the absolute difference among the absolute differences by a maximum absolute difference among the absolute differences.

2. The image recognizing method according to claim 1, wherein each of the enhanced sample images has a plurality of pixels arranged into the array, and each of the pixels of each of the enhanced sample images is corresponding to a pixel value;

wherein the pixel value corresponding to the pixel in an $i^{th}$ column and a $j^{th}$ row of the $k^{th}$ enhanced sample image of the $m^{th}$ class is obtained by multiplying the feature enhancement value in an $i^{th}$ column and a $j^{th}$ row of the feature enhancement mask by the pixel value corresponding to the pixel in an $i^{th}$ column and a $j^{th}$ row of the $k^{th}$ sample image of the $m^{th}$ class.

3. The image recognizing method according to claim 1, wherein the step of training the classifier according to the enhanced sample images corresponding to each of the classes comprises:

training the classifier by using a K-means-clustering algorithm, a linear discriminant analysis (LDA), an adaptive boosting (AdaBoost) algorithm, a neural network, or a support vector machine (SVM).

4. The image recognizing method according to claim 1, wherein the enhanced testing image has a plurality of pixels arranged into the array, and each of the pixels of the enhanced testing image is corresponding to a pixel value, wherein the pixel value corresponding to the pixel in an $i^{th}$ column and a $j^{th}$ row of the enhanced testing image is obtained by multiplying the feature enhancement value in the $i^{th}$ column and the $j^{th}$ row of the feature enhancement mask by the pixel value corresponding to the pixel in the $i^{th}$ column and the $j^{th}$ row of the corresponding testing image.

5. An image recognizing system, recognizing at least one testing image according to a plurality of classes, wherein each of the classes comprises a plurality of sample images, the image recognizing system comprising:

an image capturing unit, capturing the at least one testing image;

an image recognizing unit, coupled to the image capturing unit; and a classifier training unit, coupled to the image capturing unit and the image recognizing unit;

wherein the classifier training unit generates an average image of each of the classes according to the sample images;

wherein the classifier training unit generates a feature enhancement mask according to differences between the average images of the classes, wherein the classifier training unit enhances the sample images of each of the classes by using the feature enhancement mask to generate a plurality of enhanced sample images corresponding to the class, wherein the classifier training unit trains a classifier according to the enhanced sample images corresponding to each of the classes, wherein the image recognizing unit enhances the at least one testing image by using the feature enhancement mask to generate at least one enhanced testing image, wherein the image recognizing unit classifies the at least one enhanced testing image into one of the classes by using the classifier;

wherein the image recognizing unit recognizes that the at least one testing image which is belonged to the one of the classes, wherein each of the sample images has a plurality of pixels arranged into an array, each of the pixels is corresponding to a pixel value, and the average image of each of the classes has a plurality of average pixel values corresponding to the pixels of the sample images, wherein the average pixel value in an $i^{th}$ column and a $j^{th}$ row of the average image of an $m^{th}$ class is obtained by dividing a sum of the pixel values corresponding to the pixels in the $i^{th}$ columns and the $j^{th}$ rows of the sample images of the $m^{th}$ class by the number of the sample images of the $m^{th}$ class, wherein the feature enhancement mask has a plurality of feature enhancement values arranged into the array, and the feature enhancement values are obtained according to a plurality of absolute differences between the average pixel values of the average images of the classes, wherein a number of the classes is 2, wherein the absolute differences are arranged into the array, and a value in an $i^{th}$ column and a $j^{th}$ row of the absolute difference among the absolute differences is equal to an absolute value of a difference between the average pixel value in the $i^{th}$ column and the $j^{th}$ row of the average image of a $1^{st}$ class among classes and the average pixel value in the $i^{th}$ column and the $j^{th}$ row of the average image of a $2^{nd}$ class among classes, wherein the feature enhancement value in an $i^{th}$ column and a $j^{th}$ row of the feature enhancement mask is obtained by dividing the value in the $i^{th}$ column and the $j^{th}$ row of the absolute difference among the absolute differences by a maximum absolute difference among the absolute differences.

6. The image recognizing system according to claim 5, wherein each of the enhanced sample images has a plurality of pixels arranged into the array, and each of the pixels of each of the enhanced sample images is corresponding to a pixel value, wherein the pixel value corresponding to the pixel in an $i^{th}$ column and a $j^{th}$ row of the $k^{th}$ enhanced sample image of the $m^{th}$ class is obtained by multiplying the feature enhancement value in an $i^{th}$ column and a $j^{th}$ row of the feature enhancement mask by the pixel value corresponding to the pixel in an $i^{th}$ column and a $j^{th}$ row of the $k^{th}$ sample image of the $m^{th}$ class.

7. The image recognizing system according to claim 5, wherein the classifier training unit trains the classifier by using a K-means-clustering algorithm, a LDA, an AdaBoost algoritlun, a neural network, or a SVM.

8. The image recognizing system according to claim 5, wherein the enhanced testing image has a plurality of pixels arranged into the array, and each of the pixels of the enhanced testing image is corresponding to a pixel value, wherein the pixel value corresponding to the pixel in an $i^{th}$ column and a $j^{th}$ row of the enhanced testing image is obtained by multiplying the feature enhancement value in the $i^{th}$ column and the $j^{th}$ row of the feature enhancement mask by the pixel value corresponding to the pixel in the $i^{th}$ column and the $j^{th}$ row of the corresponding testing image.

9. An image recognizing method, recognizing at least one testing image according to a plurality of classes, wherein each of the classes comprises a plurality of sample images, the image recognizing method comprising:

generating an average image of each of the classes according to the sample images;

generating a feature enhancement mask according to differences between the average images of the classes;

enhancing the sample images of each of the classes by using the feature enhancement mask to generate a plurality of enhanced sample images corresponding to the class;

training a classifier according to the enhanced sample images corresponding to each of the classes;

enhancing the at least one testing image by using the feature enhancement mask to generate at least one enhanced testing image;

classifying the at least one enhanced testing image into one of the classes by using the classifier; and recognizing that the at least one testing image belongs to the one of the classes, wherein each of the sample images has a plurality of pixels arranged into an array, each of the pixels is corresponding to a pixel value, and the average image of each of the classes has a plurality of average pixel values corresponding to the pixels of the sample images, wherein the average pixel value in an $i^{th}$ column and a $j^{th}$ row of the average image of an $m^{th}$ class is obtained by dividing a sum of the pixel values corresponding to the pixels in the $i^{th}$ columns and the $j^{th}$ rows of the sample images of the $m^{th}$ class by the number of the sample images of the $m^{th}$ class, wherein the feature enhancement mask has a plurality of feature enhancement values arranged into the array, and the feature enhancement values are obtained according to a plurality of absolute differences between the average pixel values of the average images of the classes, wherein a number of the classes is greater than 2, wherein the absolute differences are arranged into the array, and a value in an $i^{th}$ column and a $j^{th}$ row of the absolute difference among the absolute differences is equal to an absolute value of a difference between a maximum average pixel value among the average pixel values in the $i^{th}$ column and the $j^{th}$ row of the average images of the classes and a minimum average pixel value among the average pixel values in the $i^{th}$ column and the $j^{th}$ row of the average images of the classes, wherein the feature enhancement value in an $i^{th}$ column and a $j^{th}$ row of the feature enhancement mask is obtained by dividing in the $i^{th}$ column and the $j^{th}$ row of the absolute difference among the absolute differences by a maximum absolute difference among the absolute differences.

10. The image recognizing method according to claim 9, wherein each of the enhanced sample images has a plurality of pixels arranged into the array, and each of the pixels of each of the enhanced sample images is corresponding to a pixel value;

wherein the pixel value corresponding to the pixel in an $i^{th}$ column and a $j^{th}$ row of the $k^{th}$ enhanced sample image of the $m^{th}$ class is obtained by multiplying the feature enhancement value in an $i^{th}$ column and a $j^{th}$ row of the feature enhancement mask by the pixel value corresponding to the pixel in an $i^{th}$ column and a $j^{th}$ row of the $k^{th}$ sample image of the $m^{th}$ class.

11. The image recognizing method according to claim 9, wherein the step of training the classifier according to the enhanced sample images corresponding to each of the classes comprises:

training the classifier by using a K-means-clustering algorithm, a linear discriminant analysis (LDA), an adaptive boosting (AdaBoost) algorithm, a neural network, or a support vector machine (SVM).

12. The image recognizing method according to claim 9, wherein the enhanced testing image has a plurality of pixels arranged into the array, and each of the pixels of the enhanced testing image is corresponding to a pixel value, wherein the pixel value corresponding to the pixel in an $i^{th}$ column and a $j^{th}$ row of the enhanced testing image is obtained by multiplying the feature enhancement value in the $i^{th}$ column and the $j^{th}$ row of the feature enhancement mask by the pixel value corresponding to the pixel in the $i^{th}$ column and the $j^{th}$ row of the corresponding testing image.

13. The image recognizing method according to claim 12, further comprising:

performing a histogram equalization on the sample images and the testing image.

14. The image recognizing method according to claim 13, further comprising:

reducing a dimension of each of the enhanced sample images through a principal components analysis (PCA) and a LDA; and reducing a dimension of the enhanced testing image through the PCA and the LDA.

15. An image recognizing system, recognizing at least one testing image according to a plurality of classes, wherein each of the classes comprises a plurality of sample images, the image recognizing system comprising:

an image capturing unit, capturing the at least one testing image;

an image recognizing unit, coupled to the image capturing unit; and a classifier training unit, coupled to the image capturing unit and the image recognizing unit;

wherein the classifier training unit generates an average image of each of the classes according to the sample images;

wherein the classifier training unit generates a feature enhancement mask according to differences between the average images of the classes, wherein the classifier training unit enhances the sample images of each of the classes by using the feature enhancement mask to generate a plurality of enhanced sample images corresponding to the class, wherein the classifier training unit trains a classifier according to the enhanced sample images corresponding to each of the classes, wherein the image recognizing unit enhances the at least one testing image by using the feature enhancement mask to generate at least one enhanced testing image, wherein the image recognizing unit classifies the at least one enhanced testing image into one of the classes by using the classifier;

wherein the image recognizing unit recognizes that the at least one testing image which is belonged to the one of the classes, wherein each of the sample images has a plurality of pixels arranged into an array, each of the pixels is corresponding to a pixel value, and the average image of each of the classes has a plurality of average pixel values corresponding to the pixels of the sample images, wherein the average pixel value in an $i^{th}$ column and a $j^{th}$ row of the average image of an $m^{th}$ class is obtained by dividing a sum of the pixel values corresponding to the pixels in the $i^{th}$ columns and the $j^{th}$ rows of the sample images of the $m^{th}$ class by the number of the sample images of the $m^{th}$ class, wherein the feature enhancement mask has a plurality of feature enhancement values arranged into the array, and the feature enhancement values are obtained according to a plurality of absolute differences between the average pixel values of the average images of the classes, wherein a number of the classes is greater than 2, wherein the absolute differences are arranged into the array, and a value in an $i^{th}$ column and a $j^{th}$ row of the absolute difference among the absolute differences is equal to an absolute value of a difference between a maximum average pixel value among the average pixel values in the $i^{th}$ column and the $j^{th}$ row of the average images of the classes and a minimum average pixel value among the average pixel values in the $i^{th}$ column and the $j^{th}$ row of the average images of the classes, wherein the feature enhancement value in an $i^{th}$ column and a $j^{th}$ row of the feature enhancement mask is obtained by dividing in the i$^{th}$ column and the j$^{th}$ row of the absolute difference among the absolute differences by a maximum absolute difference among the absolute differences.

16. The image recognizing system according to claim 15, wherein each of the enhanced sample images has a plurality of pixels arranged into the array, and each of the pixels of each of the enhanced sample images is corresponding to a pixel value,
wherein the pixel value corresponding to the pixel in an i$^{th}$ column and a j$^{th}$ row of the k$^{th}$ enhanced sample image of the m$^{th}$ class is obtained by multiplying the feature enhancement value in an i$^{th}$ column and a j$^{th}$ row of the feature enhancement mask by the pixel value corresponding to the pixel in an i$^{th}$ column and a j$^{th}$ row of the k$^{th}$ sample image of the m$^{th}$ class.

17. The image recognizing system according to claim 15, wherein the classifier training unit trains the classifier by using a K-means-clustering algorithm, a LDA, an AdaBoost algorithm, a neural network, or a SVM.

18. The image recognizing system according to claim 15, wherein the enhanced testing image has a plurality of pixels arranged into the array, and each of the pixels of the enhanced testing image is corresponding to a pixel value,
wherein the pixel value corresponding to the pixel in an i$^{th}$ column and a j$^{th}$ row of the enhanced testing image is obtained by multiplying the feature enhancement value in the i$^{th}$ column and the j$^{th}$ row of the feature enhancement mask by the pixel value corresponding to the pixel in the i$^{th}$ column and the j$^{th}$ row of the corresponding testing image.

19. The image recognizing system according to claim 18, wherein the image recognizing system further comprises a storage unit coupled to the classifier training unit and the image recognizing unit,
wherein the storage unit stores the classifier and the feature enhancement mask.

20. The image recognizing system according to claim 19 further comprising a normalization unit coupled to the image capturing unit, the classifier training unit, and the image recognizing unit, wherein the normalization unit performs a histogram equalization on the sample images and the testing image.

21. The image recognizing system according to claim 20, wherein the normalization unit reduces a dimension of each of the enhanced sample images through a PCA and a LDA; and
the normalization unit reduces a dimension of the enhanced testing image through the PCA and the LDA.

* * * * *